(12) United States Patent
Regent

(10) Patent No.: US 8,228,041 B2
(45) Date of Patent: Jul. 24, 2012

(54) CHARGING CONTROL DEVICE FOR SUPPLYING ELECTRONIC EQUIPMENT APPLICATION(S) AND BATTERY WITH COMPENSATED CURRENT

(75) Inventor: Nicolas Regent, Yvre le Polin (FR)

(73) Assignee: ST-Ericsson SA, Geneva (CH)

( * ) Notice: Subject to any disclaimer, the term of this patent is extended or adjusted under 35 U.S.C. 154(b) by 0 days.

(21) Appl. No.: 12/094,317

(22) PCT Filed: Nov. 14, 2006

(86) PCT No.: PCT/IB2006/054242
§ 371 (c)(1), (2), (4) Date: Jun. 16, 2008

(87) PCT Pub. No.: WO2007/060575
PCT Pub. Date: May 31, 2007

(65) Prior Publication Data
US 2008/0315844 A1    Dec. 25, 2008

(30) Foreign Application Priority Data

Nov. 25, 2005 (EP) ..................................... 05300965

(51) Int. Cl.
*H02J 7/04* (2006.01)
*H02J 7/16* (2006.01)

(52) U.S. Cl. ............................ 320/153; 320/114; 307/66
(58) Field of Classification Search .................... 320/153
See application file for complete search history.

(56) References Cited

U.S. PATENT DOCUMENTS

| | | | |
|---|---|---|---|
| 4,679,000 A | | 7/1987 | Clark |
| 5,721,481 A | * | 2/1998 | Narita et al. .................. 320/111 |
| 5,723,970 A | * | 3/1998 | Bell ............................... 320/140 |
| 6,140,801 A | * | 10/2000 | Aoki et al. .................... 320/132 |

(Continued)

FOREIGN PATENT DOCUMENTS

EP    1447897 A1    8/2004

(Continued)

OTHER PUBLICATIONS

Office Action for JP Application No. 2008-541860 with English translation, mailed Dec. 21, 2010, pp. 6.

(Continued)

*Primary Examiner* — Ramy Ramadan
(74) *Attorney, Agent, or Firm* — William J. Kubida; Peter J. Meza; Hogan Lovells US LLP

(57) ABSTRACT

A charging control device (D) is installed in a piece of electronic equipment (EE) comprising a rechargeable battery (B) and at least an internal application (A) requiring an application current for its operation. This device (D) comprises a charging control module (CCM) arranged to be coupled to a charger (CH), to be fed with a charge current when it is connected to mains, and coupled i) to the battery (B) to control its charge and provide it with a chosen battery current when so required and when its temperature is within a chosen interval, and ii) to the application (A) to provide it with the application current when the electronic equipment (EE) is connected to the charger (CH). The device (D) also comprises a current sensor means (SM) arranged to determine the current consumed by the application (A) and to deliver a first signal representative of this current consumption. The charging control module (CCM) is further arranged i) either to provide the application (A) with an application current equal to the current represented by the first signal while forcing the battery (B) to keep its charge when its temperature is outside the chosen interval, ii) or to provide the application (A) with an application current equal to the current represented by the first signal while providing the battery (B) with a chosen battery current in order that it may be simultaneously charged when its temperature is within the chosen interval.

16 Claims, 1 Drawing Sheet

U.S. PATENT DOCUMENTS

| | | | |
|---|---|---|---|
| 7,157,810 B2 * | 1/2007 | Kanouda et al. | 307/66 |
| 7,425,817 B2 * | 9/2008 | Kodner et al. | 320/150 |
| 7,592,777 B2 * | 9/2009 | Lu et al. | 320/141 |
| 2003/0220026 A1 | 11/2003 | Oki et al. | |
| 2004/0145348 A1 * | 7/2004 | Bucur et al. | 320/128 |
| 2006/0103356 A1 * | 5/2006 | Kodner et al. | 320/150 |

FOREIGN PATENT DOCUMENTS

| | | |
|---|---|---|
| EP | 1494332 A2 | 1/2005 |
| GB | 2403608 A | 1/2005 |
| JP | 07177681 A | 7/1995 |
| JP | 2004-215464 | 7/2004 |
| JP | 2004-279139 A | 10/2004 |
| JP | 2005-323483 | 11/2005 |

OTHER PUBLICATIONS

Japanese Patent Office Action with English translation, Application No. 2008-541860, mailed Jan. 24, 2012, pp. 4.

* cited by examiner

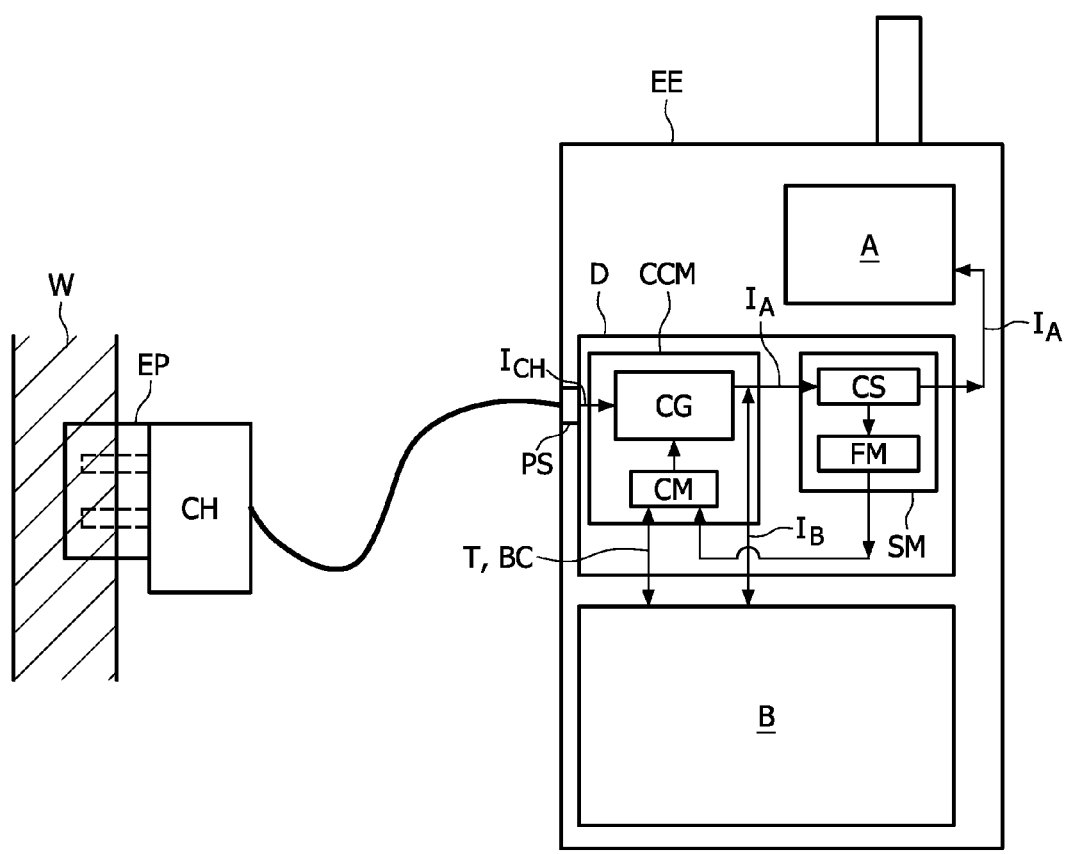

CHARGING CONTROL DEVICE FOR SUPPLYING ELECTRONIC EQUIPMENT APPLICATION(S) AND BATTERY WITH COMPENSATED CURRENT

FIELD OF THE INVENTION

The present invention relates to the current supply of some portable electronic equipment, and more precisely to the charging of rechargeable batteries supplying such portable electronic equipment.

The expression "portable electronic equipment" here denotes any electronic device or apparatus that can be used when it is disconnected from the mains thanks to its rechargeable battery. This may be a personal digital assistant (or PDA), a mobile phone, a cordless phone, or a music player (such as an MP3 player), for example.

BACKGROUND OF THE INVENTION

As is known to those skilled in the art, many (portable) electronic devices comprise a charging control module which is arranged to recharge their (rechargeable) batteries and one or more of their internal applications with currents when connected to a charger (which in its turn is connected to the mains) via their plug sockets.

More precisely, the charging control module controls the charge state and the temperature of the battery and supplies it with a current when the charge state is lower than a chosen threshold and when its temperature is within a chosen interval, and supplies each internal application with the current it requires for operating under certain circumstances.

The current $I_{CH}$ provided by the charger to the charging control module is constant. So, when an application requires an application current $I_A$ for its operation while the charge state of the battery is below the chosen threshold and its temperature is within the chosen interval, the current $I_B$ that the charging control module is capable of providing to the battery for charging purposes is limited ($I_B = I_{CH} - I_A$). This current $I_B$ being lower than the maximum current fixed by the battery manufacturer (usually equal to 1 C, i.e. one times the battery capacity) and required to charge the battery quickly (i.e. when there is no internal application being supplied), the battery charging time increases when an application consumes a portion of the current $I_{CH}$.

Moreover, when the battery temperature is outside the chosen interval, the charging control module stops delivering any current either to the battery or to the operational application ($I_{CH} = 0$). Therefore, the battery charging is stopped and the battery discharges itself in supplying the operational application.

It is accordingly an object of this invention to improve this situation, and more precisely to cause the battery charge state to remain constant when battery charging is forbidden, and as far as possible to enable the battery charging time to remain approximately constant.

SUMMARY OF THE INVENTION

For this purpose, it provides a charging control device for electronic equipment comprising a rechargeable battery and at least an internal application requiring an application current for its operation, and comprising a charging control module arranged to be coupled to a charger, to be fed with a charge current when it is connected to the mains, and coupled on the one hand to this battery to control its charge and provide it with a chosen battery current when so required and when its temperature is within a chosen interval, and on the other hand to the application to provide it with the application current when the electronic equipment is connected to the charger.

This charging control device is characterized in that it also comprises a current sensor means arranged to determine the current consumed by the application and to deliver a first signal representative of this current consumption, and in that its charging control module is arranged either to provide the application with an application current equal to the current represented by the first signal while forcing the battery to keep its charge when its temperature is outside the chosen interval, or to provide the application with an application current equal to the current represented by the first signal while providing the battery with a chosen battery current in order that it may be simultaneously charged when its temperature is within the chosen interval.

The charging control device according to the invention may include additional characteristics considered separately or combined, in particular:

its current sensor means may comprise a current sensor arranged to deliver a second signal representative of the current which is instantaneously being consumed by the application, and a filtering means coupled to the current sensor and charging control module and arranged to process the second signals to deliver the first signals;

the filtering means may be arranged to integrate several second signals delivered by the current sensor over a chosen period in order to deliver a first signal;

its charging control module may be arranged to provide the battery with a battery current chosen such that its charging time be approximately constant, independently of the application current provided;

the battery may be of the Li-ion type or Li-Polymer type, for example.

The invention also relates to a (portable) piece of electronic equipment comprising a charging control device such as the one introduced above. Such a piece of electronic equipment may be chosen from amongst a personal digital assistant (PDA), a mobile phone, a cordless phone, and a music player, for example.

BRIEF DESCRIPTION OF THE DRAWING

Other features and advantages of the invention will become apparent from an examination of the detailed specifications below and the appended drawing, wherein the sole FIGURE schematically and functionally illustrates an example of (portable) electronic equipment comprising a charging control device according to the invention.

The appended drawing may not only serve to complete the invention, but also to contribute to its definition, if need be.

DESCRIPTION OF THE PREFERRED EMBODIMENT

In the following description it will be considered that the charging control device D illustrated in the sole FIGURE is installed in a portable electronic piece of equipment EE comprising a rechargeable battery B, such as a mobile phone. But it may be installed in any portable electronic equipment equipped with a rechargeable battery, for example in a Personal Digital Assistant (PDA), a cordless phone, or a music player such as an MP3 player.

As is illustrated in the FIGURE, the charging control device D according to the invention comprises a charging control module CCM and a current sensor module SM.

The charging control module CCM is coupled to the battery B and to at least one internal application A of the mobile phone EE, but also to a plug socket PS of this mobile phone EE. Internal applications that may be suggested are, for example, the display of video images or the establishment of communication.

This plug socket PS allows the mobile phone EE to be connected to a charger CH which can be connected to the mains by means of an electric plug connector EP (for example inserted into a socket in a wall W).

The battery B is also coupled to each of the internal applications A to supply it with an application current when the mobile phone EE is disconnected from the charger CH. This battery B is of the Lithium-ion (or Li-ion) type, for example, but it may be of an alternative type such as, for example, the Lithium-Polymer type.

When the mobile phone EE is connected to the mains via the charger CH, the charging control module CCM receives a charge current $I_{CH}$ from this charger CH and is responsible for supplying the battery B with a battery current $I_B$ for charging purposes and at least one internal application A with an application current $I_A$ for purposes of operation.

More precisely, the charging control module CCM comprises a current generator CG and a control module CM.

The current generator CG receives the charge current $I_{CH}$ from the charger CH (through the plug socket PS) and delivers this charge current $I_{CH}$ to an output which feeds the internal application A with a chosen application current $I_A$, as required, and/or the battery B with a battery current $I_B$ limited by the battery manufacturer, depending on instructions coming from the control module CM.

The control module CM is connected to the battery B and receives signals representative of its temperature (T) and of its charge state (BC). It is arranged to compare on the one hand each signal representative of the battery temperature T with a temperature interval depending on the battery type and defined by the battery manufacturer, and on the other hand each signal representative of the battery charge state BC with a chosen threshold also defined by the battery manufacturer.

When the battery temperature is within the temperature interval and the battery charge state is lower than the chosen threshold, the control module CM authorizes the current generator CG to supply the battery B with a battery current $I_B$ limited by the battery manufacturer, in order that said battery B may be charged. If an internal application requires an application current $I_A$ at the same time, the control module CM authorizes the current generator CG to supply this application A with the required application current $I_A$.

The current sensor module SM is arranged to provide the control module CM with a first signal representative of the application current $I_A$ that the internal application A requires for its operation. Thus the current sensor module SM and the charging control module CCM define a current compensation loop which renders it possible to supply a working internal application A with the required application current $I_A$ while the mobile phone EE is being supplied by the charger CG, whatever the battery temperature.

More precisely, the current sensor module SM preferably comprises a current sensor CS coupled to the supply line that connects the current generator CG to the internal application A and arranged to determine a second signal representative of the current which is instantaneously being consumed by this internal application A. The current sensor module SM also preferably comprises a filtering module FM coupled to the current sensor CS and to the charging control module CCM (and more precisely to its control module CM) and arranged to process the second signals delivered by the current sensor CS in order to generate the first signals therefrom and to transmit them to the control module CM.

For example, the filtering module FM is arranged to integrate several second signals, consecutively delivered by the current sensor CS, over a chosen period in order to deliver each first signal. This integration avoids that the control module CM will process application currents which are not significant and subsequently transmit to the current generator CG instructions on that basis for keeping the current compensation loop stable.

When the battery temperature is outside the temperature interval, whatever the battery charge state, the control module CM forbids the current generator CG to supply the battery B with the battery current $I_B$, while instructing it to supply the internal application A with the required application current $I_A$. So, the battery B can neither be charged nor discharged. Compared with the devices of the state of the art, in which the battery B supplies the internal application A with the required application current $I_A$ and then discharges itself, here it is the current generator CG which supplies the internal application A with the required application current $I_A$. In other words, the current generator CG takes the place of (or compensates) the battery B in relation to the internal application A.

As soon as the battery temperature is within the temperature interval again, the battery B can be charged again or is ready to supply an internal application A if the mobile phone EE is disconnected from the charger CH.

When the battery temperature is within the temperature interval, the battery current $I_B$, provided to the battery B by the current generator CG is constant and limited because it is fixed by the battery manufacturer (usually equal to 1 C). Therefore, the battery charging time is approximately constant, independently of the application current $I_A$ being provided to the internal application A by the current generator CG. In other words, the battery charging time is approximately constant even when an internal application A consumes an application current $I_A$. By "approximately constant" one means here preferably constant or constant to +/−5%.

Thanks to the invention, the battery B and the internal application A are supplied with battery current $I_B$ and application current $I_A$, respectively, through the charging path without any additional supply path.

The control module CM and the filtering module FM are typically realized with hardware modules or a combination of hardware and software modules.

The invention is not limited to the embodiments of charging control device and electronic equipment described above, which serve merely as examples, but it encompasses all alternative embodiments which may be considered by those skilled in the art within the scope of the appended claims.

The invention claimed is:

1. A charging control device for electronic equipment, comprising:
   a rechargeable battery and at least one internal application requiring an application current for operation;
   a charging control module coupled to a charger capable of providing a charge current, wherein the charging control module comprises a control module and is coupled to the rechargeable battery and the charging control module is configured to control a charge to the rechargeable battery and configured to provide to the rechargeable battery a predetermined battery current, wherein the amount of charge and current provided is responsive to a temperature of the rechargeable battery within a predetermined interval, wherein the charging control module further comprises a current generator configured to provide an application with an application current from a received charge current when said electronic equipment is coupled to said charger; and a sensor module comprising a current sensor wherein the sensor module is coupled to the charging control module and wherein the sensor is configured to determine a consumed current by said application and to provide a first signal representative of said consumed current to the charging control module, wherein said charging control module is operative to provide said application with an application current equal to the current represented by said first signal, and wherein the charging control module is configured to maintain a constant charge when the battery temperature is outside said chosen interval, and operative to provide said application with an application current equal to the current represented by said first signal while providing said battery with a chosen battery current in order that the battery can be simultaneously charged when the battery temperature is within said chosen interval.

2. The device according to claim 1, wherein said current sensor comprises:
 a current sensory unit configured to deliver a second signal representative of the current which is instantaneously being consumed by said application; and
 a filter module coupled to said current sensor, wherein the filter is configured to process said second signal so as to deliver said first signal.

3. The device according to claim 2, wherein the filtering module is arranged to integrate several second signals delivered by said current sensor over a chosen period in order to deliver said first signal.

4. The device according to claim 1, wherein the charging control module is operative to provide said battery with a constant charging time battery current, said constant charging current independent of the application current said charging module provides to the application.

5. The device according to claim 1, wherein said battery is of the Li-ion type.

6. The device according to claim 1, wherein said battery is of the Li-Polymer type.

7. An electronic equipment apparatus, comprising a rechargeable battery and at least an internal application requiring an application current for operation, wherein the electronic equipment comprises a charging control device according to claim 1.

8. The electronic equipment apparatus according to claim 7, wherein the electronic equipment apparatus is selected from a group consisting of a personal digital assistant, a mobile phone, a cordless phone, and a music player.

9. A mobile device, comprising:
 a rechargeable battery;
 at least one internal application requiring an application current to operate;
 a charger port;
 a charging control module coupled to the charger port, wherein the charging control module comprises a current generator and a control module;
 a current sensor module coupled to the charging control module;
 a battery coupled to the charging control module, wherein the charging control module is configured to receive signals from the battery and the signals are representative of battery charge state and battery temperature and the charging control module authorizes the current generator to provide a battery current to the battery when the battery temperature and the battery charge state are within a predetermined range; and
 an internal application requiring an application current for operation,
 wherein the current sensor is configured to provide a feedback signal to the charging control module and the feedback signal is representative of required application current for operation of the internal application, and
 wherein the battery current and application current may be supplied simultaneously, and wherein the application current is provided by the current generator from a received charge current.

10. The mobile device of claim 9, wherein the current sensor comprises:
 a current sensory unit configured to deliver a second signal representative of the current which is instantaneously being consumed by said application; and
 a filter module coupled to said current sensor, wherein the filter is configured to process said second signal so as to deliver said first signal.

11. The mobile device of claim 10, wherein the filtering module is arranged to integrate several second signals delivered by said current sensor over a chosen period in order to deliver said first signal.

12. The mobile device of claim 9, wherein the charging control module is operative to provide said battery with a constant charging time battery current, said constant charging current independent of the application current said charging module provides to the application.

13. The mobile device of claim 9, wherein said battery comprises a Li-ion type.

14. The mobile device of claim 9, wherein said battery comprises a Li-Polymer type.

15. The mobile device of claim 9, wherein the mobile device is selected from the group consisting of a personal digital assistant, a mobile phone, a cordless phone, and a music player.

16. The mobile device of claim 9, wherein the mobile device comprises a mobile phone.

* * * * *